(12) United States Patent
O'Donnell et al.

(10) Patent No.: US 10,288,322 B2
(45) Date of Patent: May 14, 2019

(54) HEAT STORAGE DEVICES FOR SOLAR STEAM GENERATION, AND ASSOCIATED SYSTEMS AND METHODS

(71) Applicant: GlassPoint Solar, Inc., Fremont, CA (US)

(72) Inventors: John Setel O'Donnell, Palo Alto, CA (US); Peter Emery von Behrens, San Francisco, CA (US)

(73) Assignee: GlassPoint Solar, Inc., Fremont, CA (US)

( * ) Notice: Subject to any disclaimer, the term of this patent is extended or adjusted under 35 U.S.C. 154(b) by 422 days.

(21) Appl. No.: 14/920,700

(22) Filed: Oct. 22, 2015

(65) Prior Publication Data

US 2016/0116188 A1 Apr. 28, 2016

Related U.S. Application Data

(60) Provisional application No. 62/067,806, filed on Oct. 23, 2014.

(51) Int. Cl.
*B23P 15/26* (2006.01)
*F24S 60/00* (2018.01)
(Continued)

(52) U.S. Cl.
CPC ............... *F24S 60/00* (2018.05); *B23P 15/26* (2013.01); *B28B 7/183* (2013.01); *B28B 7/342* (2013.01);
(Continued)

(58) Field of Classification Search
CPC .... B23P 15/26; F24J 2/34; F22B 1/006; F28F 9/0273; F28F 2265/26; F28D 20/0056;
(Continued)

(56) References Cited

U.S. PATENT DOCUMENTS 1,240,890 A 9/1917 Shuman et al.
2,217,593 A 10/1940 London
(Continued)

FOREIGN PATENT DOCUMENTS

CN 2050918 U 1/1990
CN 2926930 Y 7/2007
(Continued)

OTHER PUBLICATIONS

Adventures in Energy, "Extracting Oil and Natural Gas." 1 pages, accessed Oct. 7, 2013.
(Continued)

*Primary Examiner* — Alfred Basichas
(74) *Attorney, Agent, or Firm* — Perkins Coie LLP

(57) ABSTRACT

Heat storage devices suitable for storing solar energy, and associated systems and methods are disclosed. A representative system includes a storage housing that contains a working fluid. A working fluid inlet pipe is coupled to the storage housing. A plurality of concrete plates are positioned in the housing, with the adjacent plates at least partially forming individual flow passages. A working fluid outlet pipe is coupled to the housing. A controller maintains a predominantly laminar flow of the working fluid in the flow passages. In some embodiments, the working fluid can be thermal oil having a boiling temperature of 300° C. or higher.

23 Claims, 13 Drawing Sheets

(51) Int. Cl.
  *F22B 1/00* (2006.01)
  *F28F 9/02* (2006.01)
  *F28D 20/00* (2006.01)
  *B28B 7/18* (2006.01)
  *B28B 7/34* (2006.01)

(52) U.S. Cl.
  CPC .............. *B28B 7/346* (2013.01); *F22B 1/006* (2013.01); *F28D 20/0056* (2013.01); *F28F 9/0273* (2013.01); *F28D 2020/0008* (2013.01); *F28D 2020/0082* (2013.01); *F28F 2265/26* (2013.01); *Y02E 60/142* (2013.01); *Y02E 70/30* (2013.01)

(58) Field of Classification Search
  CPC ......... B28B 7/346; B28B 7/183; B28B 7/342; Y02E 70/30; Y02E 60/142
  See application file for complete search history.

(56) References Cited

U.S. PATENT DOCUMENTS

| | | |
|---|---|---|
| 2,221,919 A | 11/1940 | Kenan |
| 2,859,745 A | 11/1958 | von Brudersdorff |
| 3,672,572 A | 6/1972 | Delfs |
| 3,847,136 A | 11/1974 | Salvail |
| 3,923,039 A | 12/1975 | Falbel |
| 3,962,873 A | 6/1976 | Davis |
| 3,991,740 A | 11/1976 | Rabl |
| 3,994,279 A | 11/1976 | Barak |
| 3,994,341 A | 11/1976 | Anderson et al. |
| 3,996,917 A | 12/1976 | Trihey |
| 4,003,366 A | 1/1977 | Lightfoot |
| 4,015,585 A | 4/1977 | Fattor |
| 4,078,549 A | 3/1978 | McKeen et al. |
| 4,083,155 A | 4/1978 | Lampert |
| 4,088,116 A | 5/1978 | Pastor |
| 4,095,369 A | 6/1978 | Posnansky et al. |
| 4,108,154 A | 8/1978 | Nelson |
| 4,122,832 A | 10/1978 | Hirschsohn et al. |
| 4,124,277 A | 11/1978 | Stang |
| 4,143,642 A | 3/1979 | Beaulieu |
| 4,149,523 A | 4/1979 | Boy-Marcotte et al. |
| 4,159,712 A | 7/1979 | Legg |
| 4,174,752 A | 11/1979 | Slater et al. |
| 4,184,482 A | 1/1980 | Cohen |
| 4,202,322 A | 5/1980 | Delgado et al. |
| 4,209,222 A | 6/1980 | Posnansky |
| 4,219,008 A | 8/1980 | Schultz |
| RE30,407 E | 9/1980 | Lightfoot |
| 4,230,095 A | 10/1980 | Winston |
| 4,237,864 A | 12/1980 | Kravitz |
| 4,249,340 A | 2/1981 | Maes, Jr. |
| 4,258,696 A | 3/1981 | Gopal |
| 4,262,653 A | 4/1981 | Holland et al. |
| 4,263,893 A | 4/1981 | Pavlak et al. |
| 4,280,480 A | 7/1981 | Raposo |
| 4,282,394 A | 8/1981 | Lackey et al. |
| 4,287,880 A | 9/1981 | Geppert |
| 4,290,419 A | 9/1981 | Rabedeaux |
| 4,296,739 A | 10/1981 | Bolding |
| 4,314,604 A | 2/1982 | Koller |
| 4,318,394 A | 3/1982 | Alexander |
| 4,333,447 A | 6/1982 | Lemrow et al. |
| 4,343,533 A | 8/1982 | Currin et al. |
| 4,371,623 A | 2/1983 | Taylor |
| 4,372,386 A | 2/1983 | Rhoades et al. |
| 4,386,600 A | 6/1983 | Eggert, Jr. |
| 4,392,531 A | 7/1983 | Ippolito et al. |
| 4,410,156 A | 10/1983 | Pischzik et al. |
| 4,423,719 A | 1/1984 | Hutchison |
| 4,445,499 A | 5/1984 | Platell |
| 4,452,229 A | 6/1984 | Powers et al. |
| 4,452,233 A * | 6/1984 | Goodman, Jr. ............ F24J 2/055 126/653 |
| 4,462,390 A | 7/1984 | Holdridge et al. |
| 4,484,568 A | 11/1984 | Witt |
| 4,490,926 A | 1/1985 | Stokes |
| 4,513,733 A | 4/1985 | Braun |
| 4,577,679 A | 3/1986 | Hibshman et al. |
| 4,597,377 A | 7/1986 | Melamed |
| 4,628,142 A | 12/1986 | Hashizume |
| 4,727,854 A | 3/1988 | Johnson |
| 4,741,161 A | 5/1988 | Belart et al. |
| 5,018,576 A | 5/1991 | Udell et al. |
| 5,048,507 A | 9/1991 | Ridett |
| 5,058,675 A | 10/1991 | Travis |
| 5,103,524 A | 4/1992 | Vowles |
| 5,191,876 A | 3/1993 | Atchley |
| 5,258,101 A | 11/1993 | Breu |
| 5,344,496 A | 9/1994 | Stern et al. |
| 5,347,402 A | 9/1994 | Arbogast |
| 5,520,747 A | 5/1996 | Marks |
| 5,524,610 A | 6/1996 | Clark |
| 5,699,785 A | 12/1997 | Sparkman |
| 5,851,309 A | 12/1998 | Kousa |
| 5,941,238 A | 8/1999 | Tracy et al. |
| 5,954,046 A | 9/1999 | Wegler |
| 6,017,002 A | 1/2000 | Burke et al. |
| 6,129,844 A | 10/2000 | Dobelmann |
| 6,220,339 B1 | 4/2001 | Krecke |
| 6,233,914 B1 | 5/2001 | Fisher |
| 6,294,723 B2 | 9/2001 | Uematsu et al. |
| 6,363,928 B1 | 4/2002 | Anderson, Jr. |
| 6,485,152 B2 | 11/2002 | Wood |
| 6,508,850 B1 | 1/2003 | Kotliar |
| 6,547,210 B1 | 4/2003 | Marx et al. |
| 7,028,685 B1 | 4/2006 | Krecke |
| 7,055,519 B2 | 6/2006 | Litwin |
| 7,234,314 B1 | 6/2007 | Wiggs |
| 7,337,843 B2 | 3/2008 | Mecham et al. |
| 7,472,548 B2 | 1/2009 | Meksvanh et al. |
| 7,748,137 B2 | 7/2010 | Wang |
| 7,858,875 B2 | 12/2010 | Lu |
| 7,975,686 B2 | 7/2011 | Prueitt |
| 7,992,553 B2 | 8/2011 | Le Lievre |
| 8,056,555 B2 | 11/2011 | Prueitt |
| 8,167,041 B2 | 5/2012 | Chiesa et al. |
| 8,333,186 B2 | 12/2012 | Jennings |
| 8,342,169 B2 | 1/2013 | Glynn |
| 8,397,434 B2 | 3/2013 | Bayne |
| 8,430,090 B2 | 4/2013 | Angel et al. |
| 8,604,333 B2 | 12/2013 | Angel et al. |
| 8,701,773 B2 | 4/2014 | O'Donnell et al. |
| 8,739,774 B2 | 6/2014 | O'Donnell et al. |
| 8,748,731 B2 | 6/2014 | MacGregor et al. |
| 8,752,542 B2 | 6/2014 | O'Donnell et al. |
| 8,887,712 B2 | 11/2014 | von Behrens |
| 8,915,244 B2 | 12/2014 | von Behrens |
| 2001/0008144 A1 | 7/2001 | Uematsu et al. |
| 2002/0108745 A1 | 8/2002 | Kimura et al. |
| 2003/0080604 A1 | 5/2003 | Vinegar et al. |
| 2003/0188477 A1 | 10/2003 | Pasternak et al. |
| 2004/0004303 A1 | 1/2004 | Iskra |
| 2004/0055594 A1 | 3/2004 | Hochberg et al. |
| 2006/0048770 A1 | 3/2006 | Meksvanh et al. |
| 2006/0124360 A1 | 6/2006 | Lee et al. |
| 2007/0056726 A1 | 3/2007 | Shurtleff |
| 2007/0209365 A1 | 9/2007 | Hamer et al. |
| 2008/0066736 A1 | 3/2008 | Zhu |
| 2008/0083405 A1 | 4/2008 | Kimura et al. |
| 2008/0163864 A1 | 7/2008 | Larson |
| 2008/0216822 A1 | 9/2008 | Lazzara et al. |
| 2008/0236227 A1 | 10/2008 | Flynn |
| 2008/0308094 A1 | 12/2008 | Johnston |
| 2009/0056698 A1 | 3/2009 | Johnson et al. |
| 2009/0056699 A1 | 3/2009 | Mills et al. |
| 2009/0056704 A1 | 3/2009 | Donati et al. |
| 2009/0056944 A1 | 3/2009 | Nitschke |
| 2009/0199847 A1 | 8/2009 | Hawley |
| 2009/0260359 A1 | 10/2009 | Palkes |
| 2009/0277224 A1 | 11/2009 | Angel et al. |
| 2009/0277440 A1 | 11/2009 | Angel et al. |
| 2009/0294092 A1 | 12/2009 | Bahl et al. |

(56) References Cited

U.S. PATENT DOCUMENTS

| | | |
|---|---|---|
| 2009/0320830 A1 | 12/2009 | Bennett |
| 2010/0000733 A1 | 1/2010 | Chiesa et al. |
| 2010/0051016 A1 | 3/2010 | Ammar |
| 2010/0051021 A1 | 3/2010 | Kunz |
| 2010/0175687 A1 | 7/2010 | Zillmer et al. |
| 2010/0212894 A1 | 8/2010 | Latimer et al. |
| 2010/0300431 A1 | 12/2010 | Carrascosa Perez et al. |
| 2011/0017274 A1 | 1/2011 | Huang et al. |
| 2011/0088686 A1 | 4/2011 | Hochberg et al. |
| 2011/0126824 A1 | 6/2011 | Conlon et al. |
| 2011/0174935 A1 | 7/2011 | Bingham et al. |
| 2011/0203574 A1 | 8/2011 | Harding |
| 2011/0203577 A1 | 8/2011 | Coduri |
| 2011/0240006 A1 | 10/2011 | Linke et al. |
| 2011/0277470 A1 | 11/2011 | Benyaminy et al. |
| 2011/0291405 A1 | 12/2011 | Burger et al. |
| 2012/0067337 A1 | 3/2012 | Hall et al. |
| 2012/0125400 A1 | 5/2012 | Angel et al. |
| 2012/0125611 A1 | 5/2012 | Ayirala et al. |
| 2012/0138293 A1 | 6/2012 | Kaminsky et al. |
| 2012/0138316 A1 | 6/2012 | Matzakos |
| 2012/0152307 A1 | 6/2012 | MacGregor et al. |
| 2012/0167873 A1 | 7/2012 | Venetos et al. |
| 2012/0234311 A1 | 9/2012 | Johnson et al. |
| 2012/0255309 A1 | 10/2012 | Venetos et al. |
| 2012/0274069 A1 | 11/2012 | Venetos et al. |
| 2013/0062890 A1 | 3/2013 | Saar et al. |
| 2013/0092153 A1 | 4/2013 | O'Donnell et al. |
| 2013/0206134 A1 | 8/2013 | O'Donnell et al. |
| 2013/0220305 A1 | 8/2013 | von Behrens |
| 2013/0312411 A1 | 11/2013 | Newman |
| 2014/0069416 A1 | 3/2014 | von Behrens |
| 2014/0190469 A1 | 7/2014 | O'Donnell et al. |
| 2014/0216717 A1 | 8/2014 | O'Donnell et al. |
| 2014/0299120 A1 | 10/2014 | Klinkman et al. |
| 2014/0318792 A1 | 10/2014 | Chen et al. |
| 2014/0326234 A1 | 11/2014 | O'Donnell et al. |
| 2014/0345599 A1 | 11/2014 | O'Donnell et al. |
| 2014/0347757 A1 | 11/2014 | MacGregor et al. |
| 2014/0352304 A1 | 12/2014 | Arias et al. |
| 2015/0107246 A1 | 4/2015 | Bindingnavale Ranga |
| 2015/0144125 A1 | 5/2015 | von Behrens |
| 2015/0285490 A1 | 10/2015 | O'Donnell et al. |
| 2015/0345277 A1 | 12/2015 | Schooley et al. |

FOREIGN PATENT DOCUMENTS

| | | |
|---|---|---|
| CN | 200958464 Y | 10/2007 |
| CN | 201059795 Y | 5/2008 |
| CN | 101270675 A | 9/2008 |
| CN | 101280966 A | 10/2008 |
| CN | 101354191 A | 1/2009 |
| CN | 101363958 A | 2/2009 |
| CN | 201359397 Y | 12/2009 |
| DE | 102004013590 A1 | 10/2005 |
| DE | 202005021000 U1 | 1/2007 |
| DE | 102009036550 | 5/2010 |
| EP | 0041725 | 12/1981 |
| EP | 0506568 A1 | 9/1992 |
| EP | 0946432 B1 | 1/2001 |
| EP | 988493 B1 | 8/2003 |
| FR | 2696753 A1 | 4/1994 |
| JP | 56085508 | 7/1981 |
| JP | 2001082104 | 3/2001 |
| JP | 2012106282 A | 6/2012 |
| KR | 20080024309 A | 3/2008 |
| WO | WO-8501339 | 3/1985 |
| WO | WO-2007146183 A2 | 12/2007 |
| WO | WO-2008131175 A1 | 10/2008 |
| WO | WO-2008153922 A1 | 12/2008 |
| WO | WO-2009002772 A2 | 12/2008 |
| WO | 2009105643 A2 | 8/2009 |
| WO | WO-2009126875 A2 | 10/2009 |
| WO | WO-2010032095 A2 | 3/2010 |
| WO | WO-2010040957 A2 | 4/2010 |
| WO | WO-2010043744 A2 | 4/2010 |
| WO | WO-2010088632 A2 | 8/2010 |
| WO | WO-2011053863 A2 | 5/2011 |
| WO | WO-2012006255 A2 | 1/2012 |
| WO | WO-2012006257 A2 | 1/2012 |
| WO | WO-2012006258 A2 | 1/2012 |
| WO | WO-2012107478 A1 | 8/2012 |
| WO | WO-2012128877 A2 | 9/2012 |

OTHER PUBLICATIONS

Adventures in Energy, "Separating Oil, Natural Gas and Water." 1 page, accessed Oct. 7, 2013.
Bierman et al "Performance of Enclosed Trough OTSG for Enhanced Oil Recovery," SolarPaces 2013, pp. 11.
Bierman et al "Solar Enhanced Oil Recovery Plant in South Oman," SolarPaces 2013; pp. 10.
BrightSource Limitless, "Coalinga Project Facts, A BrightSource Energy Concentrating Solar Power Project," Fact Sheet, accessed Sep. 19, 2013, http://www.brightsourceenergy.com/stuff/contentmgr/files/0/ad5d33a2bc493a5079b5dda609724238/folder/coalinga_fact_sheet.pdf, 2 pages.
BrightSource Limitless, "Enhanced Oil Recovery Project—Coalinga," accessed Sep. 19, 2013, http://www.brightsourceenergy.com/coalinga, 2 pages.
Champion Technologies, "Enhanced Oil Recovery." 2 pages, accessed Oct. 7, 2013.
Proz, 'on the edge of manufacturing tolerance' [bulletin board], Mar. 12, 2005 [retrieved on Jan. 7, 2014]. Retrieved from the internet <http://www.proz.com/kudoz/English/military_defense/968330-on_the_edge_of_manufacturing_tolerance.html>.
The Linde Group, "Enhanced Oil Recovery (EOR)", 1 page, accessed Oct. 7, 2013.
Wilson, Bob. "Re: Why does a bridge have rollers under it? How do the rollers of a bridge work?", Newton Ask a Scientist! (DOE Office of Science) [online], Jan. 2, 2008 [retrieved from the internet <URL:http://web.archive.org/web/20080102111713/http://www.newton.dep.anl.gov/askasci/eng99/eng99556.htm>.
International Search Report and Written Opinion issued in Application No. PCT/US2015/056992, dated Jan. 22, 2016, 16 pages.
Abengoa Solar Inc., "Advanced Thermal Storage for Central Receivers with Supercritical Coolants," DE-FG36-08G018149, Jun. 15, 2010, 184 pages.
Abengoa Solar Inc., "Development of Molten-Salt Heat Transfer Fluid Technology for Parabolic Trough Solar Power Plants," Abengoa Solar Sunshot Conference Project Review, Apr. 24, 2013, 21 pages.
Argonne National Laboratory, "Produced Water Volumes and Management Practices in the United States," Environmental Science Division, Sep. 2009, 64 pages.
Bradshaw, Robert W., "Effect of Composition on the Density of Multi-Component Molten Nitrate Salts," Sandia Report—Sandia National Laboratories, Dec. 2009, 18 pages.
Bradshaw, Robert W., "Viscosity of Multi-component Molten Nitrate Salts—Liquidus to 200° C.," Sandia Report—Sandia National Laboratories, Mar. 2010, 20 pages.
Brosseau et al., "Testing Thermocline Filler Materials and Molten-Salt Heat Transfer Fluids for Thermal Energy Storage Systems Used in Parabolic Trough Solar Power Plants," Sandia Report—Sandia National Laboratories, Jul. 2004, 95 pages.
Carling et al., "Industrial Use of Molten Nitrate/Nitrite Salts," Sandia National Laboratories Energy Report, Dec. 1981, 34 pages.
Federsel et al., "High-Temperature and corrosion behavior of nitrate nitrite molten salt mixtures regarding their application in concentrating solar power plants," ElSevier Ltd, ScienceDirect, 2015, 8 pages.
Flueckiger et al., "Design of Molten-Salt Thermocline Tanks for Solar Thermal Energy Storage," Purdue University—Purdue e-Pubs, 2013, 51 pages.
Flueckiger et al., "Thermocline Energy Storage in the Solar One Power Plant: An Experimentally Validated Thermomechanical Investigation," Proceedings of the ASME 2011 5th International Conference on Energy Sustainability, Aug. 7-10, 2011, 7 pages.

(56) References Cited

OTHER PUBLICATIONS

Gaggiolo et al., "An innovative concept of a thermal energy storage system based on a single tank configuration using stratifying molten salts as both heat storage medium and heat transfer fluid, and with an integrated steam generator," ElSevier Ltd., ScienceDirect, 2014, 10 pages.

Gianconia et al., "Demonstration of a 1 Mwe Co-generative CSP Plant Based on Direct Molten Salts in Linear Parabolic Concentrators up to 550° C.," 2005, 5 pages.

Gomez-Vidal et al., "Castable cements to prevent corrosion of metals in molten salts," ElSevier Ltd., Solar Energy Materials and Solar Cells—ScienceDirect, 2016, 8 pages.

HITEC—Heat Transfer Salt, Technical Bulletin, Coastal Chemical Co., L.L.C., 10 pages.

John et al., "Concrete as a thermal energy storage medium for thermocline solar energy storage systems," ElSevier Ltd., ScienceDirect—Solar Energy, 2013, 11 pages.

John, Emerson Esmond, "The Development of a High Performance Concrete to Store Thermal Energy for Concentrating Solar Power Plants," University of Arkansas, Fayetteville, 2012, 195 pages.

Kolb et al., "Thermal Ratcheting Analysis of Advanced Thermocline Energy Storage Tanks," Sandia National Laboratories, 2011, 8 pages.

Pacheco et al., "Development of a Molten-Salt Thermocline Thermal Storage System for Parabolic Trough Plants," Proceedings of Solar Forum 2001 Solar Energy: The Power to Choose, Apr. 21-25, 2001, 9 pages.

Partial European Search Report for European Patent Application No. 15852185.6, Applicant: Glasspoint Solar, Inc., dated Apr. 23, 2018, 10 pages.

Renewable and Sustainable Energy Reviews, "Energy Consumption and Water Production Cost of Conventional and Renewable-energy-powered Desalination Processes," ElSevier Ltd., ScienceDirect, 2013, 14 pages.

Technical Reference, "Sodium Bentonite: Its Structure and Properties," www.CETCO.com, 2013, 7 pages.

White, Joe L., "Reactions of Molten Salts with Layer-Lattice Silicates," Agronomy Departement, Purdue University, Lafayette, Indiana, 1954, 14 pages.

Extended Search Report and Written Opinion for European Patent Application No. 15852185.6, Applicant: Glasspoint Solar, Inc., dated Aug. 2, 2018, 12 pages.

\* cited by examiner

HEAT STORAGE DEVICES FOR SOLAR STEAM GENERATION, AND ASSOCIATED SYSTEMS AND METHODS

CROSS-REFERENCE TO RELATED APPLICATION

The present application claims priority to pending U.S. Provisional Application No. 62/067,806, filed Oct. 23, 2014, and incorporated herein by reference.

TECHNICAL FIELD

The present technology is directed generally to techniques for storing the energy produced by solar concentrators, including methods and devices for economical and robust heat storage, and associated systems.

BACKGROUND

As fossil fuels become more scarce, the energy industry has developed more sophisticated techniques for extracting fuels that were previously too difficult or expensive to extract. One such technique includes injecting steam into an oil-bearing formation to free up the oil. For example, steam can be injected into an oil well and/or in the vicinity of the oil well. The high temperature of the steam heats up the adjacent formation and oil within the formation, thereby decreasing the viscosity of the oil and enabling the oil to more easily flow to the surface of the oil field. To make the process of oil extraction more economical, steam can be generated from solar power using, for example, solar power systems with concentrators (e.g., mirrors) that direct solar energy to a receiver (e.g., piping that contains a working fluid). The concentrators focus solar energy from a relatively large area (e.g., the insolated area of the mirror) to a relatively small area of the receiver (e.g., axial cross-sectional area of a pipe), thereby producing a relatively high energy flux at the receiver. As a result, the working fluid changes its phase (e.g., from water to steam) while flowing through the receiver that is subjected to a high energy flux. Generally, a steady supply of steam is preferred at an oil field for a steady production of oil. However, the production of steam by solar concentrators is a function of solar insolation, which is intrinsically cyclical (e.g., day/night, sunny/cloudy, winter/summer, etc.). Therefore, in some field applications, the solar power systems include solar heat storage devices that can store excess energy when the insolation is high and release energy when the insolation is small or nonexistent. An example of such a system is described below.

FIG. 1 is a schematic view of a system 10 for generating steam in accordance with the prior art. In the illustrated system, the sun 13 emits solar radiation 14 toward a curved concentrator (e.g., a mirror) 11 that has a line focus corresponding to the location of a receiver 12. As a result, the solar radiation 14 from a relatively large curved concentrator 11 is focused on a relatively small area of the receiver 12. As water W flows through the receiver 12, the highly concentrated solar energy causes a phase change from water W to steam S. A first portion of the steam (S1) is directed to an oil well 18 or its vicinity and a second portion of the steam (S2) is directed to a heat exchanger 15. A valve V maintains a suitable balance between the flows of steam S1 and S2. For example, the valve V can be fully closed when the steam production is relatively low, and all available steam is directed to the oil well 18. When there is excess steam available (e.g., during a period of high insolation), the second portion of steam S2 enters the heat exchanger 15, exchanges thermal energy E with a working fluid WF, which can be, for example, steam or thermal oil, and returns to the entrance of the receiver 12. Depending on the exchange of energy E in the heat exchanger 15, the temperature of the second portion of steam (S2) may still be higher than that of the water W, thereby decreasing the amount of solar energy that the water W would otherwise require to change its phase to steam.

As explained above, when the insolation is relatively high, the temperature of the second portion of steam (S2) is sufficiently high to transfer thermal energy to the working fluid WF in the heat exchanger 15. The working fluid WF then transfers thermal energy to a heat storage unit 16. Conversely, when the insolation is relatively low, the temperature of the second portion of steam (S2) is also relatively low, and the second portion of steam (S2) receives thermal energy from the working fluid WF in the heat exchanger 15. Overall, thermal energy that is stored in the heat storage device 16 when the insolation is relatively high is transferred back to steam when the insolation is relatively low. This transfer of thermal energy to and from the heat storage device 16 promotes a more even flow of the first portion of steam S1 at the oil well 18. Some examples of the prior art heat storage devices are described in the following paragraphs.

FIG. 2 illustrates a portion 20 of a heat storage device in accordance with the prior art. In the portion 20 of the heat storage device (e.g., the heat storage device 16 of FIG. 1), concrete blocks 22 surround pipes 21. When the temperature of the working fluid WF is relatively high, the flow of the working fluid WF through the pipes 21 heats up the adjacent concrete blocks 22. This part of the thermal cycle generally occurs during a period of high insolation. Conversely, when the insolation is low, the concrete blocks 22 heat the working fluid WF, which then transfers energy back to the water/steam in the heat exchanger 15 (FIG. 1). Accordingly, the heat storage device 16 recovers some thermal energy that would otherwise be wasted due to the cyclical nature of insolation. However, the illustrated system has some drawbacks. For example, the pipes 21 are relatively expensive, making the overall heat storage device 16 expensive. Due to a relatively dense distribution of the pipes 21, the amount of working fluid WF contained in the heat storage device 16 can be relatively high which further increases cost of the heat storage device 16. Furthermore, the rate of heat transfer can be poor at the junction between the pipes 21 and the concrete blocks 22, therefore reducing the efficiency of the heat storage process.

FIG. 3 is a partially schematic cross-sectional view of another heat storage device 30 in accordance with the prior art. A first working fluid WF1 (e.g., steam or oil) flows through a piping system 33 and exchanges thermal energy with a second working fluid WF2 (e.g., oil) contained in the heat storage device 30. The second working fluid WF2 can be heated by the first working fluid WF1 during periods of high insolation and the first working fluid WF1 can be heated by the second working fluid WF2 during periods of low insolation. In general, the second working fluid WF2 can absorb relatively large amount of heat without having to be pressurized due to its relatively high heat capacity and boiling point. Because the second working fluid WF2 is generally expensive, relatively inexpensive concrete plates 31 can be inserted in the heat storage device 30 to reduce the required volume of the second working fluid WF2 inside the heat storage device 30. To improve the heat transfer to/from the concrete plates 31, pumps 32 circulate the second working fluid WF2 within the heat storage device 30. However, the flow of the second working fluid WF2 around the concrete plates 31 can still vary significantly, resulting in thermal non-uniformities when heating/cooling the concrete plates 31, thereby reducing the thermal capacity of the system. Furthermore, the pumps 32 are potential points of failure within the overall system. Accordingly, there remains a need for inexpensive and thermally efficient heat storage devices that can facilitate solar heat storage and recovery.

DETAILED DESCRIPTION 1.0 Introduction

Figure 1:
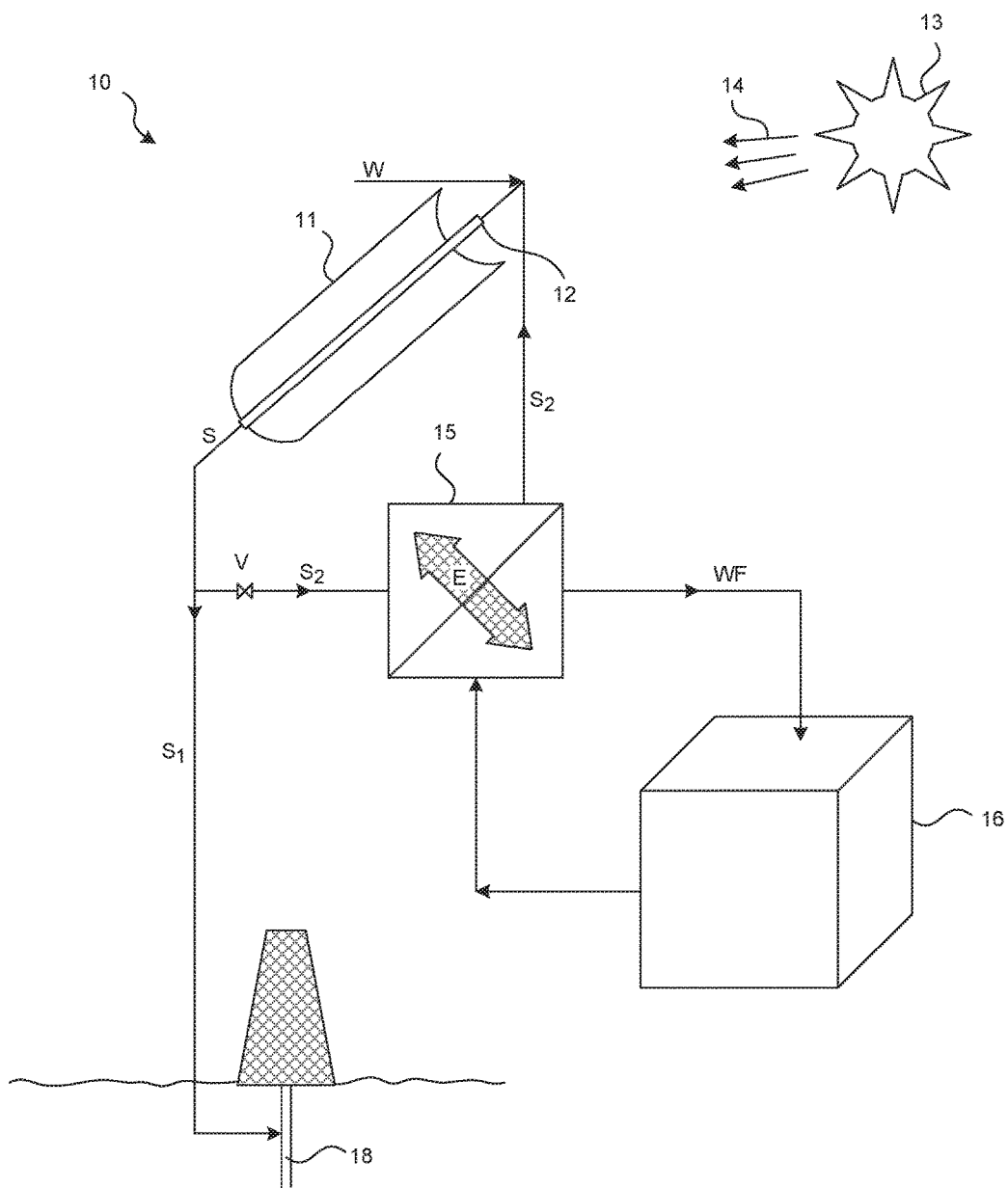
FIG. 1 is a schematic view of a system for generating steam in accordance with the prior art.
Figure 2:
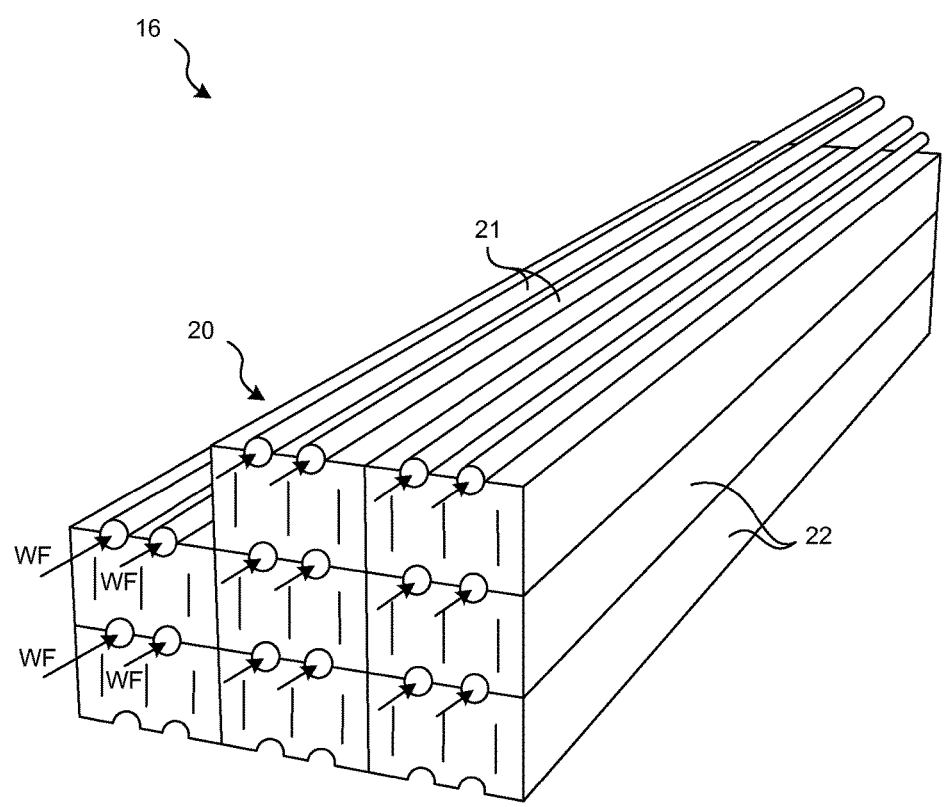
FIG. 2 illustrates a portion of a heat storage device in accordance with the prior art.
Figure 3:
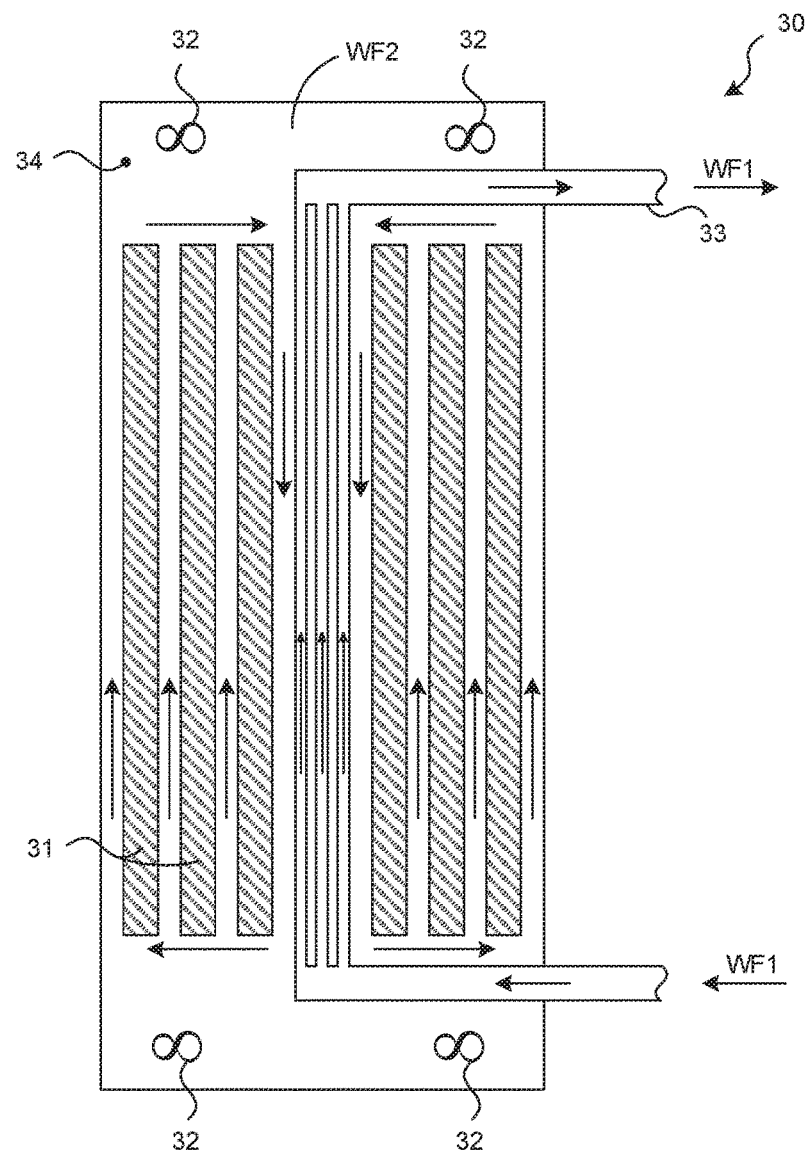
FIG. 3 is a partially schematic cross-sectional view of a heat storage device in accordance with the prior art.

Specific details of several embodiments of representative heat storage technologies and associated systems and methods for manufacture and use are described below. Heat storage technology can be used in conjunction with solar energy systems in oil fields, electrical power generation, residential or industrial heating, and other uses. Embodiments of the present technology can be used to store excess energy at, for example, periods of high insolation, and also for supplementing production of steam at, for example, periods of low insolation. A person skilled in the relevant art will also understand that the technology may have additional embodiments, and that the technology may be practiced without several of the details of the embodiments described below with reference to FIGS. 4A-9.

Briefly described, methods and systems for storing thermal energy (heat) are disclosed. The disclosed methods and systems enable cost effective and robust storage/recovery of heat energy. In contrast with the conventional heat storage devices described above, the present technology uses thin members (e.g., thin plates) that are spaced closely together. The relatively thin members (e.g., thin concrete plates) have a more uniform temperature distribution in the thickness direction than do thicker plates. As a result, the thin plates can store larger amounts of heat per unit weight, with the entire cross-section of the plates being at or close to isothermal conditions. Such plates can store and release heat faster because the final temperature gradient is established faster for a thin plate than for a thick plate made of the same material. Additionally, the relatively thin, closely spaced plates have a relatively large area for heat exchange, resulting in a faster heat storage/release process. Furthermore, the disclosed methods and systems control the flow of the working fluid (e.g., a thermal oil) to be within a generally laminar flow regime, which is beneficial because the pressure drops in the laminar flow regime are smaller than those associated with turbulent flow regimes. In contrast with the present technology, conventional technologies rely on turbulent flows that result in higher coefficients of heat transfer (generally a desirable outcome), but at the cost of significantly higher pressure drops in the system. With the present technology, the laminar flow is facilitated by generally small distances between the adjacent plates and, at least in some embodiments, by controllers that limit the flow rate of the working fluid in the spaces between the adjacent plates. In several embodiments, the potential downside of the lower heat transfer coefficient of the laminar flow is more than offset by the benefit of the lower pressure drops in the system.

In some embodiments of the present technology, the thin plates can be manufactured at the installation site. For example, a sacrificial material (e.g., wax sheets) can be spaced apart within a mold and then concrete can be added into the mold. After the concrete in the mold solidifies (e.g., to form concrete plates), the sacrificial material can be removed (e.g., by melting). Manufacturing at the installation site reduces the transportation costs for the generally large and heavy heat storage devices. In at least some embodiments, the sacrificial material can have apertures that enable interconnections between the concrete plates in the mold. After the concrete poured in the mold solidifies and the sacrificial material is removed, the interconnected concrete plates can have (1) improved crack resistance due to additional structural strength of the connections between the plates, and/or (2) improved heat transfer due to the additional heat transfer area that the connections create in the flow of working fluid.

Many embodiments of the technology described below may take the form of computer- or controller-executable instructions, including routines executed by a programmable computer or controller. Those skilled in the relevant art will appreciate that the technology can be practiced on computer/controller systems other than those shown and described below. The technology can be embodied in a special-purpose computer, controller or data processor that is specifically programmed, configured or constructed to perform one or more of the computer-executable instructions described below. Accordingly, the terms "computer" and "controller" as generally used herein refer to any data processor and can include Internet appliances and hand-held devices (including palm-top computers, wearable computers, cellular or mobile phones, multi-processor systems, processor-based or programmable consumer electronics, network computers, mini computers and the like). Information handled by these computers can be presented at any suitable display medium, including a CRT display or LCD.

The technology can also be practiced in distributed environments, where tasks or modules are performed by remote processing devices that are linked through a communications network. In a distributed computing environment, program modules or subroutines may be located in local and remote memory storage devices. Aspects of the technology described below may be stored or distributed on computer-readable media, including magnetic or optically readable or removable computer disks, as well as distributed electronically over networks. Data structures and transmissions of data particular to aspects of the technology are also encompassed within the scope of the embodiments of the technology.

2.0 Representative Heat Storage Devices

Figure 4A:
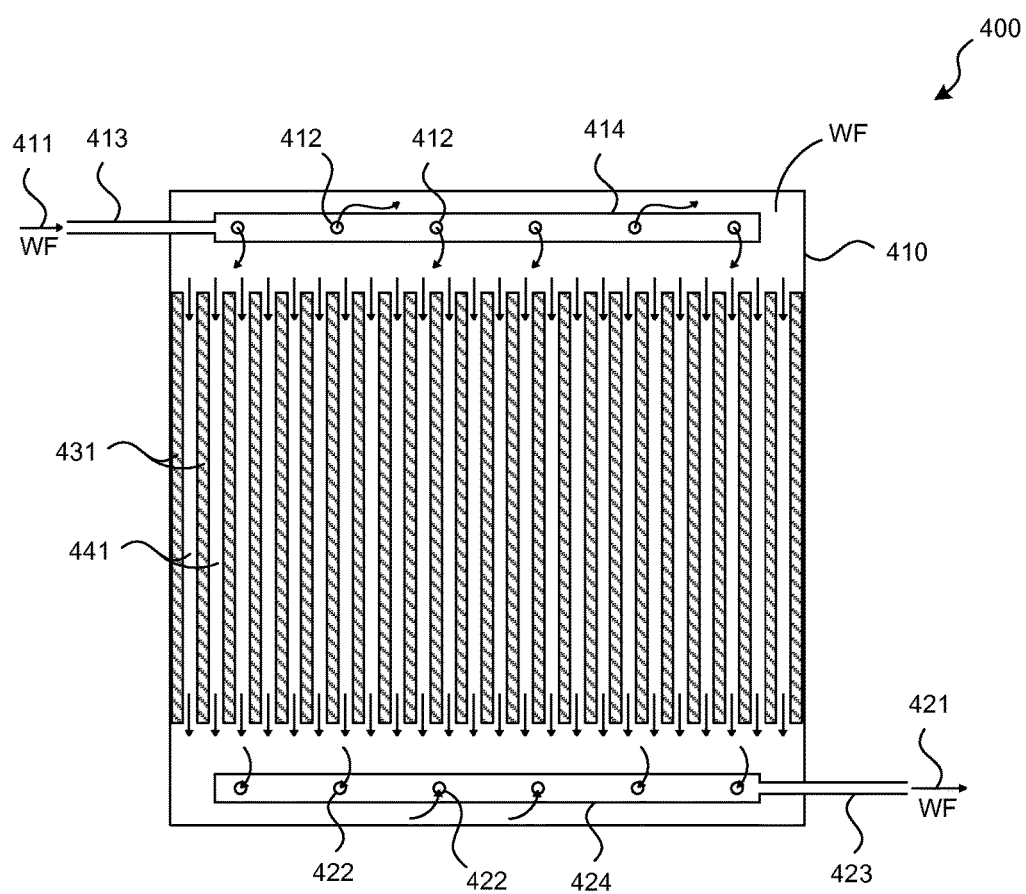
FIGS. 4A-4C are partially schematic cross-sectional views of a heat storage device in accordance with an embodiment of the presently disclosed technology.

FIG. 4A is a partially schematic cross-sectional view of a heat storage device 400 configured in accordance with an embodiment of the presently disclosed technology. The heat storage device 400 can include plates 431 (e.g., concrete plates) spaced apart and arranged in a housing 410, an inlet pipe 413 connected to an inlet manifold 414, and an outlet pipe 423 connected to an outlet manifold 424. In some embodiments, the plates 431 can be generally parallel and equidistant. In operation, a flow (indicated by a flow arrow 411) of the working fluid WF (e.g., thermal oil) can enter the heat storage device 400 through the inlet pipe 413. In some embodiments, the inlet manifold 414 has a larger cross section than that of the inlet pipe 413. Therefore, as the working fluid WF enters the inlet manifold 414, the velocity of the working fluid WF decreases and the pressure increases, resulting in a more uniform discharge of the working fluid through openings 412 spaced along the manifold 414. As a result, the flow of the working fluid leaving the manifold 414 and approaching the plates 431 can also be more uniform.

Channels 441 between the adjacent plates 431 can be sized to facilitate a predominantly laminar flow in the channels. For example, in some embodiments the velocity of the working fluid and spacing between the plates 431 can be selected such that the Reynolds number (i.e., [velocity of the fluid]×[characteristic dimension of the flow passage]/[kinematic viscosity of the fluid]) is smaller than 2,000-5,000. The term "predominantly laminar" in this disclosure encompasses flows that may be turbulent or separated in some regions, e.g., close to the outer edges of the plates 431, but are mostly laminar between the plates 431. In some embodiments of the present technology, the spacing between the adjacent plates 431 (i.e., the width of the channels 441) can be 1-2 mm. Such a spacing between the plates can also prevent an excessively low Reynolds number (e.g., less than about 3), where the viscous forces would dominate the flow and the flow between the plates 431 would be too slow.

The predominantly laminar flow in the flow channels 441 can result in relatively low pressure drops within the heat storage device 400. As a result of the relatively low pressure drops, the thermal performance of the heat storage device 400 can be less sensitive to imperfections and nonuniformities in the size/shape of the channels 441. That is, the velocity of the working fluid varies with the nonuniformities in the size/shape of the channels 441, but these variations are generally less pronounced for laminar flow than for turbulent flow. Since the heat transfer to/from the plates 431 is a function of the velocity of the working fluid, the variations in in the heat transfer to/from the plates 441 will also be smaller as a result of the laminar flow in the channels 441.

After flowing through the channels 441, the working fluid WF can enter the outlet manifold 424 through openings 422. As explained in relation to the inlet manifold 414, a relatively large diameter of the outlet manifold 424 reduces the velocity of the working fluid therefore increasing the uniformity of the flow across the heat storage device 400. The working fluid WF can leave the heat storage 400 through the outlet pipe 423 as indicated by a flow arrow 421, and can flow back to the solar heating system.

As described above, the plates 431 can be relatively thin. For example, in some embodiments, the thickness of an individual plate 431 can be 10-20 or 20-30 mm. The relatively thin plates 431 produce a relatively large overall plate surface area for a given volume of the heat storage device 400. Since heat is transferred between the working fluid WF and the plates 431 through the surface area of the plates 431, a large total surface area of the plates 431 (relative to their volume) improves the transfer of heat into and out of the plates. This improved heat transfer can, for example, reduce the time to fully warm up or cool down plates 431, thereby increasing the thermal efficiency of the heat storage device 400. Furthermore, the temperature gradients in the thickness direction of the plates 431 are expected to be more uniform from one plate to another than for thick plates. For an individual plate, the temperature gradients are expected to be shallower, allowing the thin plates to reach equilibrium more quickly than would the thick plates. In at least some embodiments, the plates may be designed to have temperature distribution in the direction of the thickness of the plate within +/−5% or +/−1% of the average temperature in the direction of thickness at a given height of the plate (i.e., the temperature being within 5% or 1% of the isothermal condition in the direction of the thickness). In other embodiments the temperature distributions can be different, for example, the temperature distribution can be within +/−10% of the average temperature in the direction of the thickness of the plate. With the thick plates used in the conventional technology, such a narrow temperature distribution across the thickness of the plates is generally not achievable within the typical daily insolation cycles.

In at least some embodiments, the working fluid WF can withstand relatively high temperatures (e.g., 300° C. or higher) without being pressurized, so as to transfer a large amount of energy to the plates 431. In some embodiments, the working fluid WF can be a molten salt capable of operating at even higher temperatures (e.g., 500° C. or higher). An optional coating, cladding or other encapsulant or enclosure can provide insulation around all or a portion of the heat storage device 400. For example, the insulation can include an air barrier, woven insulation, blown insulation, a ceramic barrier, and/or another suitable configurations.

Figure 4C:
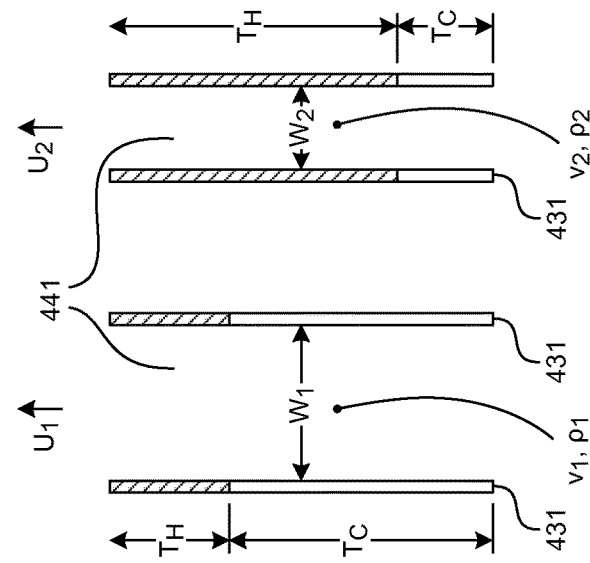
Figure 4B:
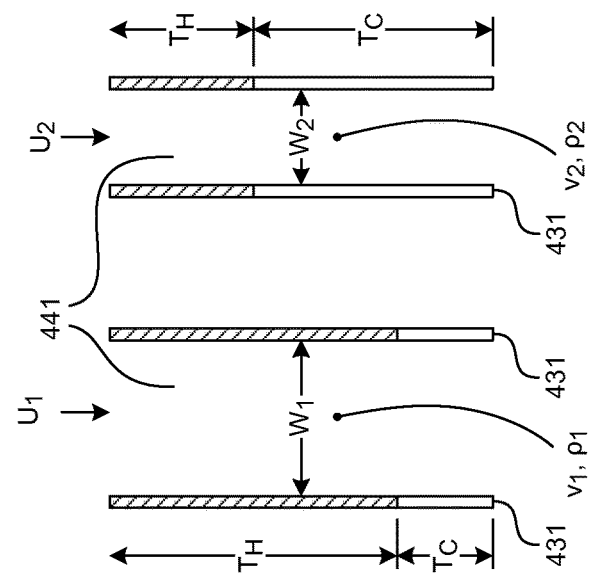

FIGS. 4B and 4C are partially schematic views of the plates of a heat storage device 400 configured in accordance with an embodiment of the presently disclosed technology. Collectively, FIGS. 4B and 4C illustrate balancing the flow of the working fluid through the channels 441. In at least some embodiments, the direction of the flow of the working fluid can be downward when the working fluid transfers heat to the plates 431 (e.g., when the insolation is relatively high), and upward when the plates 431 transfer heat to the working fluid (e.g., when the insolation is relatively low). For example, the direction of the flow in FIG. 4B is from the top to the bottom, which can be representative of the plates 431 being heated by the working fluid (e.g., the working fluid is warmer than the plates 431). The direction of the flow in FIG. 4C is from the bottom to the top, that is the plates 431 can be cooled down by the working fluid (e.g., the working fluid is colder than the plates 431.) The direction of the gravitational force is from the top to the bottom in both FIGS. 4B and 4C. The channels 441 can have a non-uniform width due to, for example, manufacturing errors or tolerances. For example, in FIGS. 4B and 4C the leftmost channels have width $W_1$ that is larger than the width $W_2$ of the rightmost channels. Generally, relatively wide channels having width $W_1$ would result in a relatively larger working fluid velocity $U_1$ due to smaller pressure drops associated with the wider channels. Conversely, relatively narrow channels having width $W_2$ would result in a relatively smaller working fluid velocity $U_2$. Such a non-uniformity in the working fluid velocity may be undesirable because, for example, some plates 431 would be heated/cooled too fast or too slow in comparison with the other plates 431. For example, during a heating cycle, a plate 431 that is adjacent to a wide channel, may be heated faster than the rest of the plates in the thermal storage 400, leading to a flow of the warm working fluid through the wide channel that, at least for a part of the cycle, does not transfer heat from the working fluid to the plate (e.g., after the plate is fully warmed up). The undesirable non-uniformities in the working fluid flow/plate temperature can be at least partially offset as explained below.

As explained above, a channel with a larger width $W_1$ generally promotes a relatively larger working fluid velocity $U_1$, and a narrower channel width $W_2$ generally promotes a relatively smaller working fluid velocity $U_2$. In at least some embodiments, for the relatively thin plates 431 the heat transfer from the working fluid to the plates can be relatively fast, i.e., the plates reach the temperature of the working fluid relatively fast. For example, in FIG. 4B the higher fluid velocity $U_1$ heats the vertical length of the plates in the channel (e.g., the leftmost plate) faster than the lower fluid velocity $U_2$ (e.g., the rightmost plate). As a result, the portion of the vertical length of the plates 431 at a relatively high temperature $T_H$ is larger for the plates of the wider channel $W_1$ than the corresponding portion $T_H$ for the plates of the narrower channel $W_2$. The working fluid at a higher temperature also has a lower viscosity and lower density than the working fluid at a lower temperature. Therefore, an overall relatively warmer fluid in the channel $W_1$ has overall relatively smaller viscosity $v_1$ and smaller density $p_1$ in comparison to the viscosity and density $p_2$ for the (overall) relatively colder fluid in the channel $W_2$. The lower viscosity $v_1$ corresponding to the working fluid in the channel $W_1$ further promotes faster velocity of the working fluid in comparison to the working fluid in the channel $W_1$. However, the overall warmer fluid in the channel $W_1$ also experiences a higher buoyancy, which can at least partially counteract the higher velocity of the working fluid in the channel $W_1$. Namely, the flow direction that the buoyancy promotes is from the bottom to the top, i.e., in the direction opposite from the direction of the gravitational force. Due to a relatively smaller density $p_1$ in the channel $W_1$, the buoyancy effect will be more pronounced in the channel $W_1$ than in the channel $W_2$. Therefore, in at least some embodiments of the present technology, the buoyancy of the working fluid in the channels 431 can make the flow in the channels having different widths (e.g., $W_1$ and $W_2$) at least substantially uniform.

In FIG. 4C, the flow of the working fluid in the two channels having different widths ($W_1$ and $W_2$) is from the bottom of the page to the top of the page, and is opposite from the direction of the gravitational force. As explained above, the pressure drop coefficient for a wider channel is generally smaller than the pressure drop coefficient for a corresponding narrow channel, thus generally promoting a higher working flow velocity in the wider channel. In some embodiments, the working fluid entering the channels can be colder than the plates 431, therefore heat is transferred from the plates 431 to the working fluid. As explained above, cooling the plates 431 with a relatively faster flow velocity $U_1$ in the wide channel $W_1$ generally results in a longer vertical length of the plates 431 being at a relatively cold temperature $T_C$. Conversely, a relatively slower flow velocity $U_2$ in the narrow channel $W_2$ results in a shorter length of the plates 431 being at a relatively cold temperature $T_C$. Since the density of the working fluid in the channels 441 is proportional to the (overall) temperature of the working fluid in the channel, an average density $p_1$ of the working fluid in the wider channel $W_1$ is higher (due to the overall lower temperature of the working fluid) than the corresponding average density $p_2$ of the working fluid in the more narrow channel $W_2$ (due to the overall higher temperature of the working fluid). For a vertical column of the working fluid, the relatively higher density $p_1$ results in a relatively higher pressure head in the wider channel $W_1$, and the relatively lower density $p_2$ results in a relatively lower pressure head in the narrower channel $W_2$. As a result, the higher pressure head in the wider channel $W_1$ tends to reduce the working fluid velocity $U_1$ in the wider channel, and the lower pressure head in the narrower channel $W_2$ tends to promote (increase) the working fluid velocity $U_2$ in the narrower channel. As a consequence, the differences in the pressure heads of the wider channel $W_1$ and narrow channel $W_2$ promote a generally uniform flow (or at least a more uniform flow) within the channels having different widths.

Figure 5A:
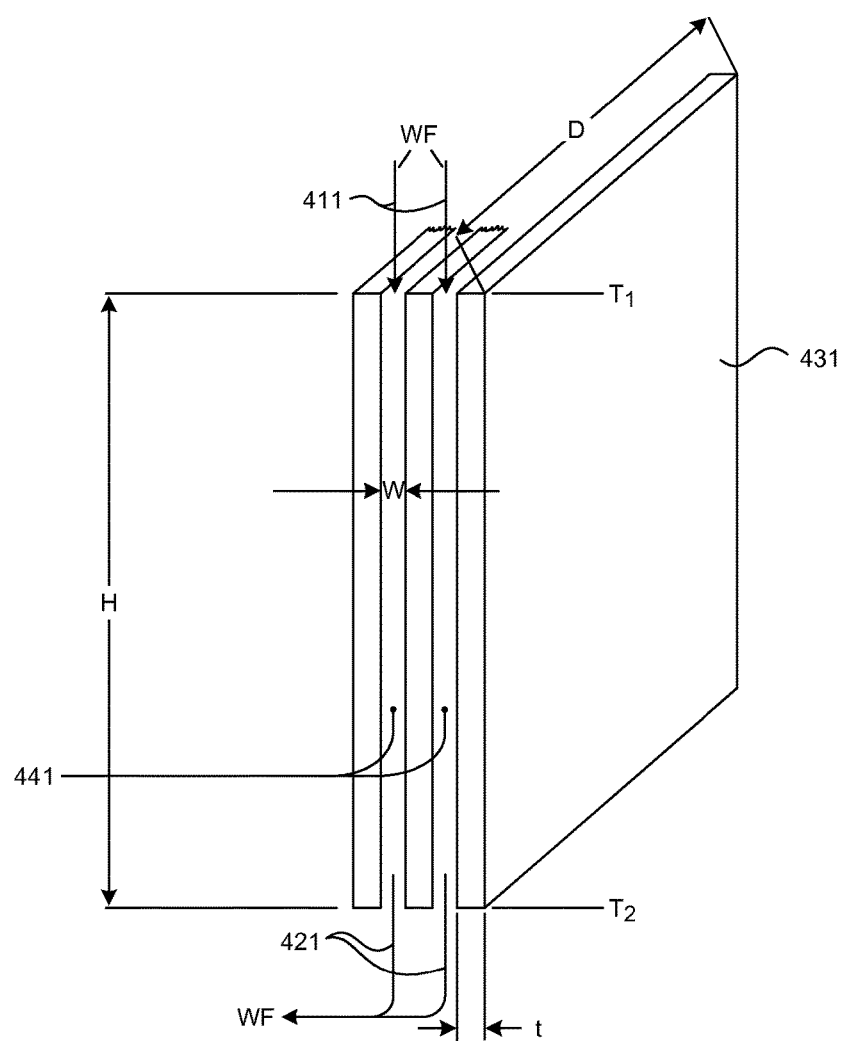
FIGS. 5A and 5B are partially schematic views of an arrangement of plates for a heat storage device in accordance with an embodiment of the presently disclosed technology.
Figure 5B:
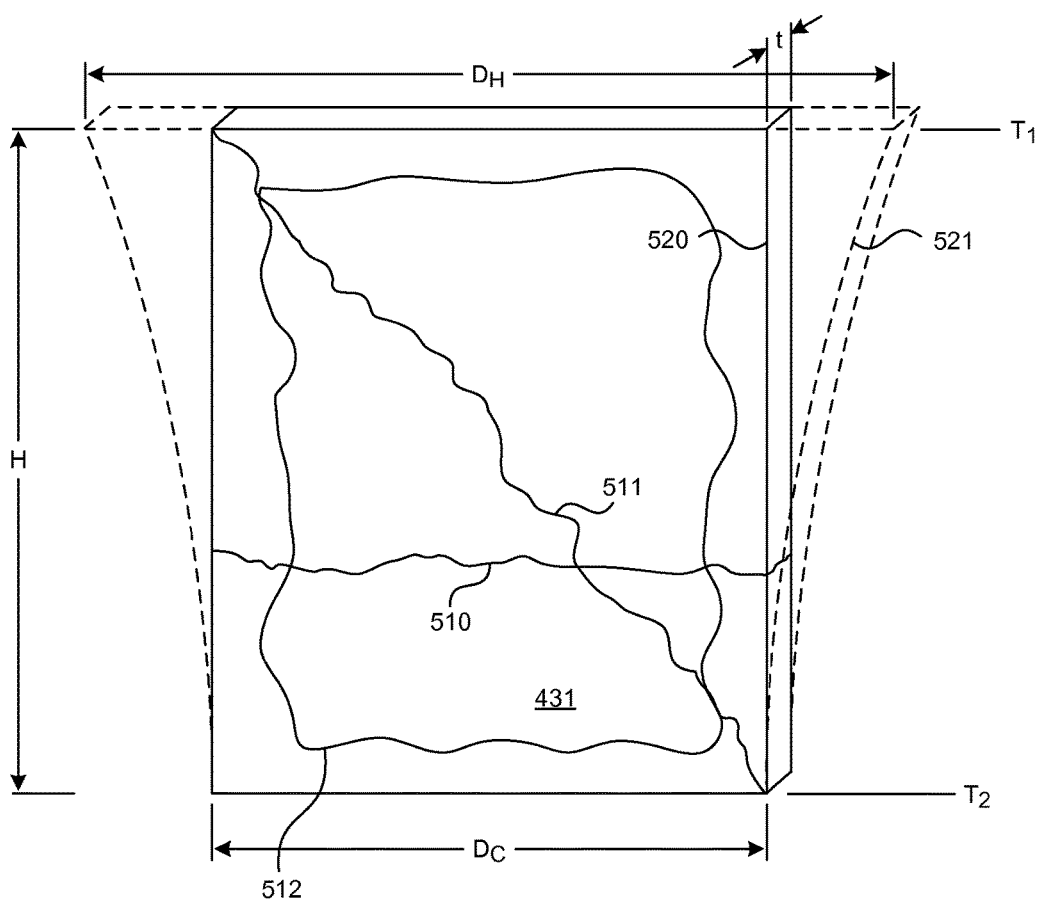

FIGS. 5A and 5B are partially schematic views of an arrangement of plates for a heat storage unit in accordance with an embodiment of the presently disclosed technology. FIG. 5A illustrates the plates 431, e.g., concrete plates. FIG. 5B schematically illustrates the expected thermal expansion of a plate 431 as it undergoes heating during normal use. In a particular embodiment, the individual concrete plates 431 are 0.5-1.5 m deep (D), 2.5-5 m high (H) and 10-30 mm thick (d), and the plates can have other suitable dimensions in other embodiments. In operation, the working fluid WF enters the channels 441 between the adjacent plates 431 as indicated by the flow arrow 411, and leaves as indicated by the flow arrows 421. Therefore, in the illustrated embodiment the working fluid WF flows inside the channels 441 primarily in the direction of the height H. In some embodiments, due to a generally steady flow in the individual channels 441, the temperature of the plates 431 changes uniformly from $T_1$ to $T_2$ in the direction of the flow (with $T_1$ generally higher than $T_2$ when the insolation is high, and vice versa when the insolation is low). In at least some embodiments, it is desirable that the velocity and temperature of the working fluid do not vary from one channel to another, or at least do not vary significantly, and for the individual plates 431 to have the same or comparable temperature profiles (e.g., the same or comparable temperature gradient from $T_1$ to $T_2$). Therefore, in at least some embodiments, a distance between the adjacent plates 431 (i.e., the width W of the channels 441) is generally same (aside from, e.g., manufacturing errors and tolerances) to promote the same flow rates in the channels 441 and the same temperature profiles in the plates 431.

FIG. 5B schematically illustrates an expected thermal expansion of a plate 431 in accordance with an embodiment of the presently disclosed technology. As explained above, the widths of the channels 441 between neighboring plates 431 can be designed and formed to be generally constant. However, cracks that develop in the plate 431 (e.g., due to thermal stresses or vibrations) may change the channel widths. With some cracks, a section of the plate 431 may become offset from the principal plane of the plate therefore changing the effective width of the channel 441. For example, a crack 512 may separate a section of the plate 431 from the rest of the plate. Under some conditions, the separated section of the plate can move out of the principal plane of the plate (e.g., out of the plane of page in FIG. 5B) to create a wider channel on one side of the plate 431 and a narrower channel on the opposite side of the plate 431, thereby affecting the uniformity of the flow in the channels. To counteract this problem, the present technology can include one or more preferred direction(s) for crack development, as explained below.

In FIG. 5B, an initial outline 520 of the unheated plate 431 is illustrated with a solid line. As the working fluid travels downwardly in the channels 441 (in the direction of the height H), the working fluid heats the plate 431. The upper portion of the plate achieves a higher temperature ($T_1$) than the temperature $T_2$ of the lower portion of the plate. The resulting outline of the plate 431 is illustrated (in an exaggerated manner for purposes of illustration) with a dashed line 521, and indicates that the upper portion of the plate 431 has a depth $D_H$ that is larger than a depth $D_C$ at the lower portion of the plate. The difference between the depths $D_H$ and $D_C$ can promote diagonal cracks 511 that extend diagonally across the plate. Such diagonally extending cracks 511 in general do not promote separation of the sections of the plate out of the principal plane of the plate. In some embodiments, the plate 431 may be purposely weakened (e.g., thinned), to create a preferred direction for a crack 510 to propagate (e.g., by shaping the wax sheet described below with reference to FIGS. 6A-6C). The cracks 510 and 511 do not (or at least do not significantly) promote separation of the sections of the plate that could change the width of the channels for the working fluid. Therefore, even when the plate 431 includes cracks 510 and/or 511, the channel width remains generally constant and the flow of the working fluid remains generally the same in the individual channels.

Figure 6A:
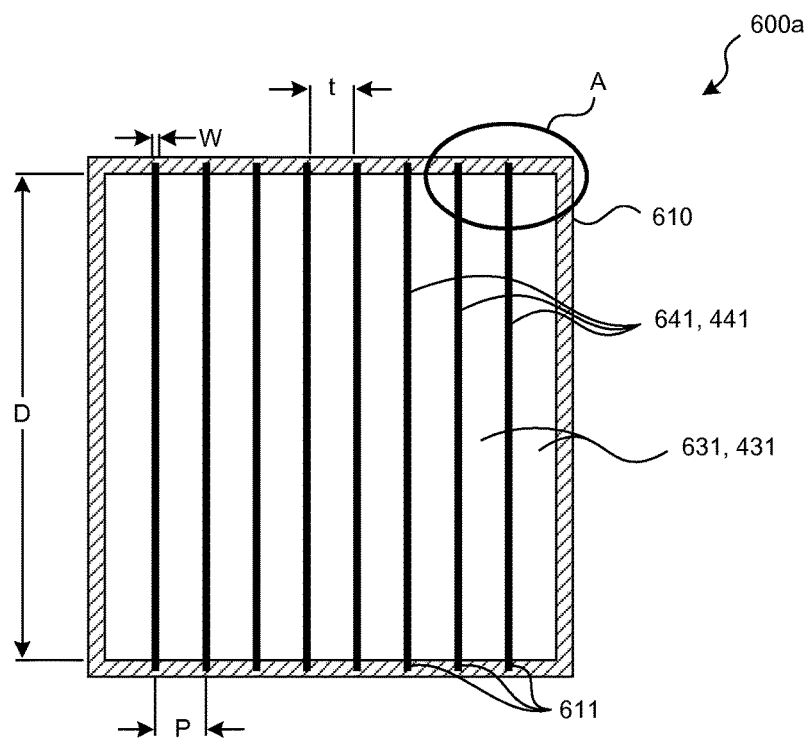
FIGS. 6A-6C are schematic views of a mold for manufacturing a heat storage device in accordance with embodiments of the presently disclosed technology.
Figure 6B:
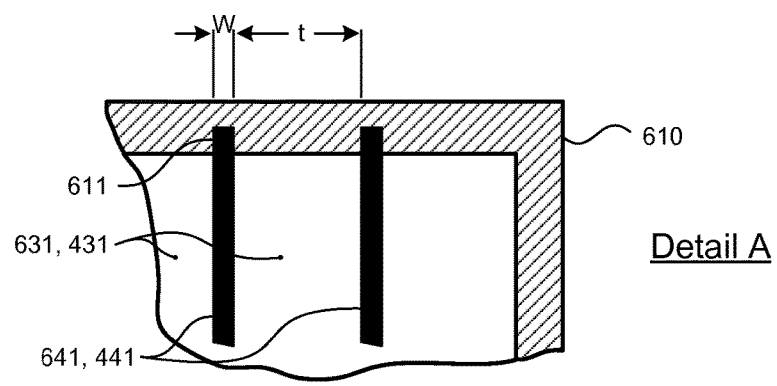

FIG. 6A is a schematic view of a mold 600a for manufacturing a heat storage device in accordance with an embodiment of the presently disclosed technology. FIG. 6B is a detailed view of a portion of the mold 600a. FIGS. 6A and 6B are discussed together below. The mold 600a can include a mold housing 610 that contains sacrificial sheets 641 (e.g., formed from a meltable wax) arranged at a spacing or pitch P. In some embodiments of the present technology, an arrangement of supporting structures, for example grooves 611, can maintain the sacrificial sheets 641 at a required spacing. In other embodiments, clips or holders or other suitable devices may be used to hold the sacrificial sheets in place. After arranging the sacrificial sheets 641 inside the mold housing 610, a molding material 631 (e.g., concrete) can be poured into the mold 600a (e.g., into the plane of page). In some embodiments of the present technology, the molding material 631 can be poured between the sacrificial sheets 641 such that an approximately similar amount of the molding material 631 flows into the spaces between the sacrificial sheets 641. As a result, a pressure of the concrete on the two opposing sides of the sacrificial sheets 641 is similar, and the sacrificial sheets 641 generally maintain their initial position and shape during the molding process. In other embodiments, the mold 600a can be turned on its side such that the sacrificial sheets 641 are horizontal. The molding process can start by adding an amount of the molding material 631 to cast one plate 431. Next, a sacrificial sheet 641 can be placed over the already added molding material, followed by adding an amount of the molding material that is sufficient to cast another plate 431. The process can then be repeated for the number of required plates 431.

When the molding material 631 solidifies, the sacrificial sheets 641 can be removed by, for example, melting them at a sufficiently high temperature (e.g. when the sacrificial sheets are made of a meltable wax or other material. In some embodiments, the sacrificial sheets may be removable by a chemical reaction that, for example, dissolves or gasifies the sacrificial sheets 641. A depth D of the sacrificial sheets 641 generally corresponds to a depth D of the channels 441. In any of the above embodiments, after the molding material 631 solidifies, the plates 431 can be removed by, for example, disassembling the mold housing 610. An advantage of embodiments of the present technology is that relatively thin plates 431 can be created without having to machine the concrete. Furthermore, in at least some embodiments of the present technology, the illustrated molding process can be performed at the site, resulting in reduced transportation costs and delays.

Figure 6C:
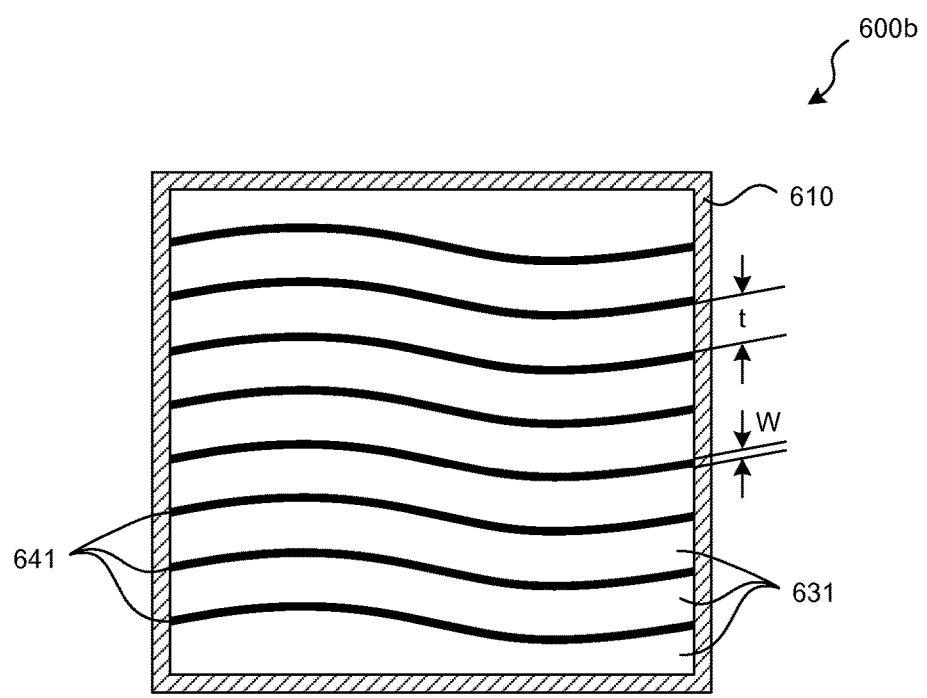

FIG. 6C is a schematic view of a mold 600b for manufacturing a heat storage device in accordance with an embodiment of the presently disclosed technology. The mold 600b can include a mold housing 610 that contains sacrificial sheets 641 (e.g., formed from meltable wax or plastic). The sacrificial sheets 641 can be arranged generally horizontally, but do not need to be necessarily horizontal and can be generally wavy. In an embodiment of the present technology, the process for manufacturing the plates 631 can start with pouring concrete at the bottom of the mold housing 610, followed by placing down a sacrificial sheet 641 (or pouring the material of the sacrificial sheet 641) over the concrete. Next, an additional layer of concrete (or other plate material) can be poured, followed by an additional sacrificial sheet 641, and the process continues. After the concrete (or other material of the plates 631) solidifies, the sacrificial sheets 641 are removed by, for example, melting or chemical reaction. The resulting channels (where the sacrificial sheets 641 used to be) can have a generally constant width W. Therefore, for a flow of the working fluid in and out of the page, even though the channel may be wavy, the width W of the channel is essentially constant (other than for manufacturing or tolerance variations). In at least some embodiments, not having to produce flat plates may simplify the manufacturing process and/or make it more robust.

Figure 7B:
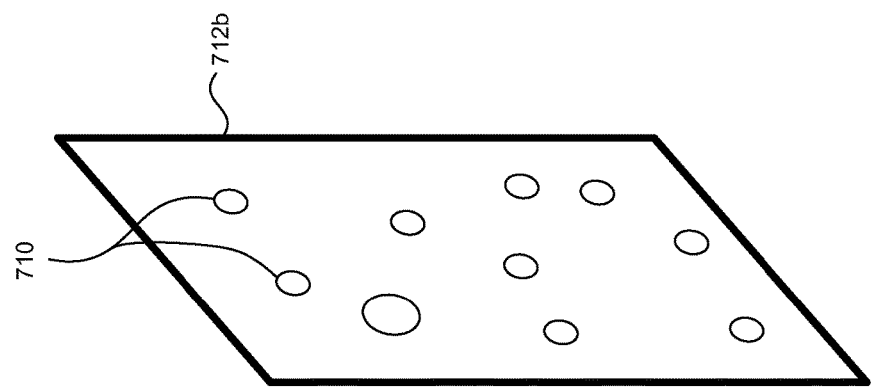
FIGS. 7A and 7B are partially schematic isometric views of sacrificial sheets used to manufacture heat storage devices in accordance with embodiments of the presently disclosed technology.
Figure 7A:
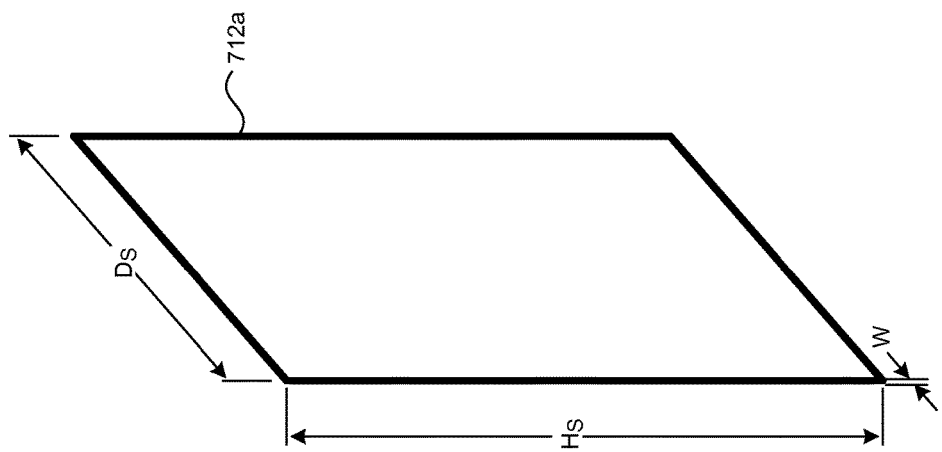

FIGS. 7A-B are partially schematic isometric views of sacrificial sheets configured in accordance with embodiments of the presently disclosed technology. FIGS. 7A, 7B illustrate sacrificial sheets 712a, 712b, respectively, having a depth $D_S$ and a height $H_S$ that generally determine the depth/height of the corresponding channels of the heat storage device. In an embodiment shown in FIG. 7A, the sacrificial sheet 712a is generally solid. As a result, the molded plates have side surfaces that are generally flat and are not connected to the adjacent plates. In an embodiment shown in FIG. 7B, the sacrificial sheet 712b includes openings 710 that, during the molding process, allow a flow of the molding material through the openings 710 from a space occupied by one plate to a space occupied by an adjacent plate. As a result, the side surfaces of the adjacent plates in the mold can be connected by the mold material in the openings 710. After the sacrificial material is removed (e.g., by melting), the connections between the adjacent plates remain in place. Generally, the connections can add structural strength and can reduce cracking of the otherwise relatively slender plates. Additionally, in operation, when the working fluid flows in the channel, the fluid also flows around the connections between the adjacent plates. Therefore, the connections can provide an additional area for the heat exchange between the working fluid and the plates. Furthermore, the connections can maintain the designed spacing between plates, and therefore the widths of the flow channels between plates. The illustrated openings 710 are generally oval, but can have other shapes (e.g., slits oriented in the direction of flow) in other embodiments.

Figure 8A:
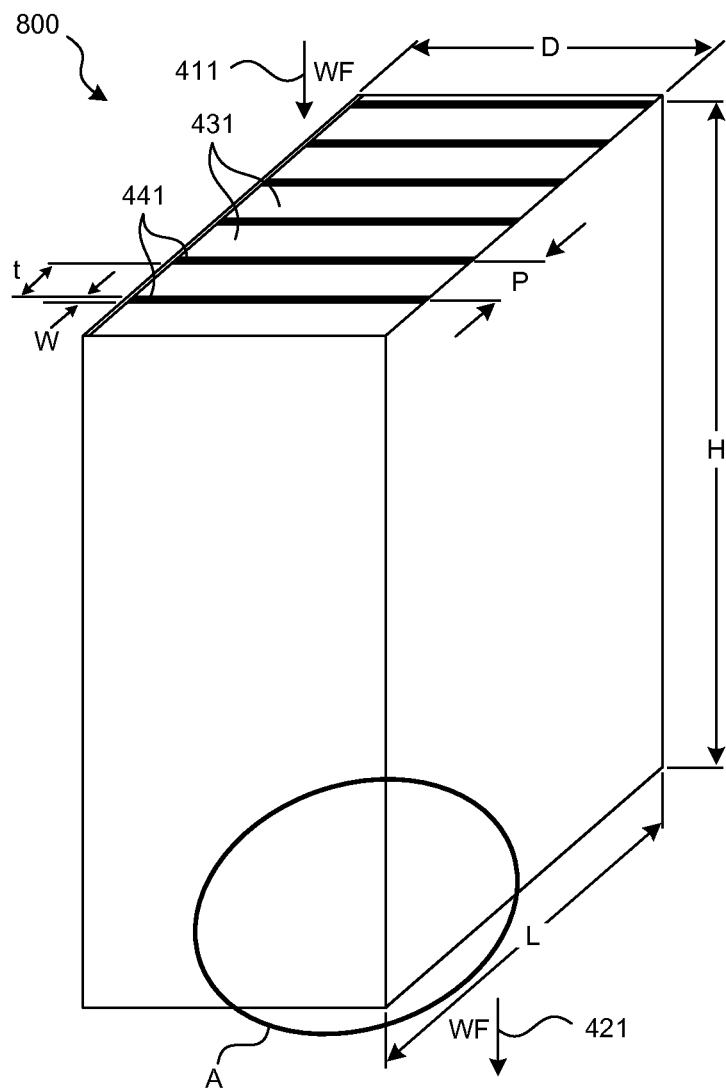
FIGS. 8A and 8B are partially schematic isometric views of a heat storage device in accordance with an embodiment of the presently disclosed technology.
Figure 8B:
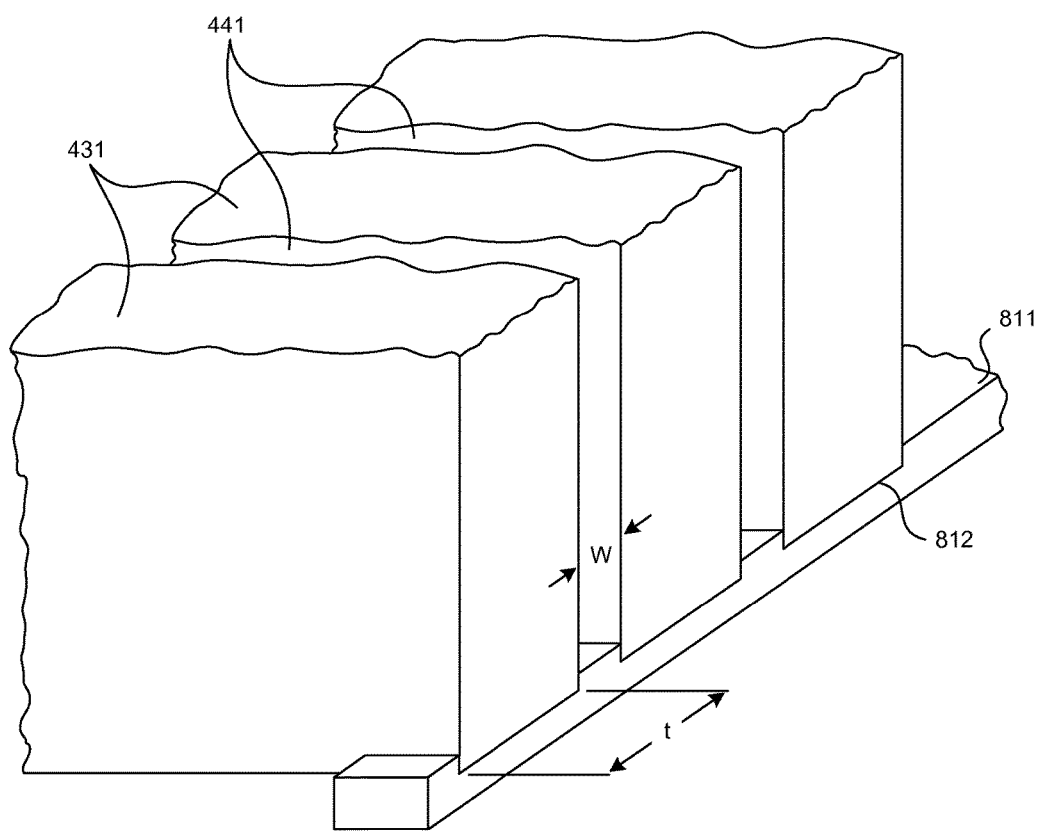

FIG. 8A is a partially schematic isometric view of a heat storage device 800 configured in accordance with an embodiment of the presently disclosed technology. FIG. 8B is a detailed view of a portion of the heat storage device 800. The illustrated heat storage device 800 includes several plates 431 arranged along a length L. The plates 431 have a thickness t, a depth D and a height H. The spaces between the adjacent plates corresponds to the width W of the channels 441. A distance between the consecutive channels 441 is a pitch P. Flow arrows 411, 421 indicate the direction of flow of the working fluid WF. In operation, the working fluid WF can flow through the channels 441 from the top to the bottom of the heat storage device 800 to transfer heat to/from the plates 431. The working fluid WF leaves the heat storage device 800 at the bottom, as illustrated by the flow arrow 421.

FIG. 8B illustrates a portion of an arrangement of the plates 431. In the illustrated embodiment, a base plate 811 supports the plates 431 inside corresponding base grooves 812. A width of the base grooves 812 is generally the same as the thickness of the plates 431. In other embodiments, the width of the base grooves can be larger than the thickness of the plates 431. In some embodiments, additional base plates 811 can support the plates 431 at, for example, corners of the plates 431 to maintain a generally vertical position of the plates 431. A distance between the adjacent base grooves 812 can at least in part determine the width W of the channels 441. In some embodiments of the present technology, the base plate 811 can be manufactured from the same material as the plates 431 (e.g., from concrete) for lower cost and shorter lead times. Depending on a required amount of steam at the oil field or in other field use, a single heat storage device 800 may not have sufficient capacity and, therefore, multiple heat storage devices 800 may be arranged together, as explained below with reference to FIG. 9.

Figure 9:
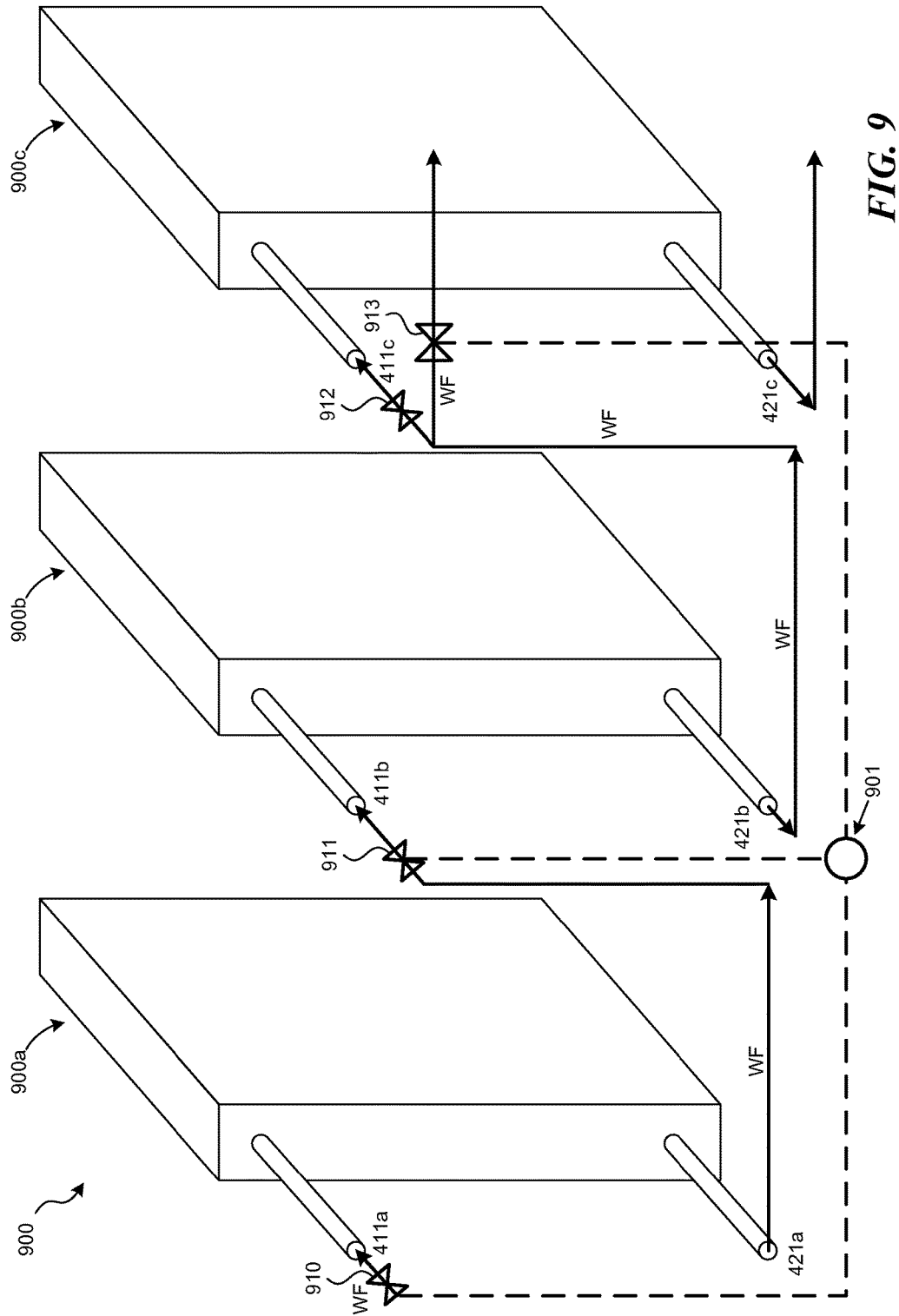
FIG. 9 is a schematic illustration of an arrangement of heat storage devices in accordance with an embodiment of the presently disclosed technology.

FIG. 9 is a schematic illustration of an arrangement 900 of multiple heat storage devices in accordance with an embodiment of the presently disclosed technology. The illustrated embodiment includes three heat storage devices (indicated as first-third devices 900a-900c), and in other embodiments, the arrangement can include other numbers of heat storage devices, depending (for example) on the overall heat storage capacity needs of a particular application. In any of these embodiments, when the solar insolation is relatively high, the working fluid generally (e.g., for most of the time) transfers heat to the plates inside the heat storage. Conversely, when the solar insolation is relatively low, the plates generally transfer heat to the working fluid.

In the illustrated arrangement 900, the working fluid WF can enter the first heat storage 900a as indicated by flow arrow 411a at the top of the unit, and leave as indicated by flow arrow 421a at the bottom of the unit when the working fluid WF transfers heat to the plates of the heat storage 900a. The heat storage devices 900a-900c are arranged in series, e.g., the working fluid WF flows from the outlet of the first heat storage device 900a to the inlet of the second heat storage device 900b (arrow 411b), and, after exiting the second heat storage device 900b (arrow 421b), further to the inlet of the third heat storage device 900c (arrow 411c), and from the exit of the third heat storage device 900c (arrow 421c). Such an arrangement of the flow of the working fluid WF through the heat storage devices 900a-900c can correspond to a relatively high insolation. Conversely, when the insolation is relatively low, the flow of the working fluid WF can enter the first heat storage device 900a at the bottom, flow through the first heat storage device 900a while receiving heat from the plates in the first heat storage device 900a, exit the first heat storage device 900a at the top, and enter at the bottom of the second heat storage device 900b, and go on to the third heat storage device 900c.

The arrangement 900 is a sample arrangement of heat storage devices, and other field-specific serial/parallel arrangements can be used in other embodiments. Furthermore, the three heat storage devices are illustrated as having generally the same shape and size, but the heat storage devices can have different shapes and/or sizes in other embodiments.

The arrangement 900 can include valves positioned to regulate amount of the working fluid flowing through any one or combination of heat storage devices. In some embodiments, the valves can be controlled by a controller 901 to limit or stop the flow of the working fluid to some of the heat storage devices, depending on, for example, insolation and required production of the steam in the field. In other embodiments, the controller 901 can control valves 910-913 to maintain a laminar or generally laminar flow through the heat storage devices of the arrangement 900, or at least through some heat storage devices. In other embodiments, the arrangement can include other numbers and/or locations of the valves. The controller 901 may include a computer-readable medium (e.g., hard drive, programmable memory, optical disk, non-volatile memory drive, etc.) that carries computer-based instructions for directing the operation of the valves 910-913 and/or other components of the assembly and/or larger system.

In a particular embodiment, the systems described above can include trough-shaped, mirror-based solar concentrators. In other embodiments, the solar collection systems can include other types of solar collectors, including, but not limited to point-source collectors, power-tower arrangements, dish-shaped collectors, and/or Fresnel collectors. Particular embodiments of the systems described above were described in the context of water as a working fluid. In other embodiments, the systems can operate in generally the same manner, using other types of working fluids, or combinations of different working fluids.

While various advantages and features associated with certain embodiments have been described above in the context of those embodiments, other embodiments may also exhibit such advantages and/or features, and not all embodiments need necessarily exhibit such advantages and/or features to fall within the scope of the present technology. Accordingly, the disclosure can encompass other embodiments not expressly shown or described herein.

To the extent any materials incorporated herein by reference conflict with the present disclosure, the present disclosure controls.

We claim:

1. A system for storing solar energy, comprising:
a storage housing;
a working fluid inlet pipe coupled to the storage housing;
a plurality of concrete plates positioned in the housing, wherein adjacent plates at least partially form individual flow passages;
a working fluid outlet pipe coupled to the housing; and
a controller configured to control a flow of a working fluid in the flow passages at a predominantly laminar flow rate.

2. The system of claim 1, further comprising the working fluid.

3. The system of claim 1 wherein a width of an individual flow passage is generally uniform between adjacent plates.

4. The system of claim 1 wherein an individual flow passage has a generally rectangular cross section.

5. The system of claim 4 wherein the plurality of plates includes:
- a first plate having a first surface in contact with the working fluid, and
- a second plate adjacent to the first plate, the second plate having a second surface facing the first surface of the first plate, where the first surface and the second surface are connected with a plurality of concrete connections.

6. The system of claim 1 wherein a width of an individual flow passage is 1-2 mm.

7. The system of claim 1 wherein a thickness of an individual plate is 10-30 mm.

8. The system of claim 1 wherein a Reynolds number (Re) for the flow through the individual flow passage is smaller than 2,000.

9. The system of claim 1 wherein the working fluid is an oil having a boiling point of at least 300° C.

10. The system of claim 1, further comprising:
- an inlet manifold in fluid communication with the inlet pipe, wherein a flow area of the inlet manifold is larger than a flow area of the inlet pipe, and wherein the inlet manifold has a first plurality of openings positioned to distribute the working fluid within the housing; and
- an outlet manifold in fluid communication with the outlet pipe, wherein a flow area of the outlet manifold is larger than a flow area of the outlet pipe, and wherein the outlet manifold has a second plurality of openings positioned to direct the working fluid into the outlet manifold and to the outlet pipe.

11. The system of claim 1 wherein the storage housing is a first storage housing, the system further comprising a second storage housing in serial fluid communication with the first storage housing, wherein an arrangement of the plates in the first storage housing is generally similar to that of the plates in the second storage housing.

12. The system of claim 1 wherein the storage housing is a first storage housing, the system further comprising a second storage housing in a parallel fluid communication with the first storage housing, wherein an arrangement of the plates in the first storage housing is generally similar to that of the plates in the second storage housing.

13. The system of claim 1 wherein at least one concrete plate includes a crack extending from a first side edge to a second side edge of the at least on concrete plate.

14. The system of claim 1, further comprising:
- one or more control valves operably coupled to the controller, wherein the controller is configured to control the flow of the working fluid at the predominantly laminar flow rate by regulating the one or more control valves.

15. The system of claim 1 wherein the controller includes computer-executable instructions that, when executed, cause the flow of the working fluid to be controlled at the predominantly laminar flow rate.

16. A method for storing solar energy, comprising:
- directing a working fluid through an inlet pipe to a storage housing;
- directing the working fluid through a plurality of flow passages in the storage housing that are at least partially bounded by adjacent concrete plates;
- transferring heat from the working fluid to the concrete plates;
- directing the working fluid through an outlet pipe out of the storage housing; and
- controlling a flow of the working fluid through the plurality of flow passages to be predominantly laminar.

17. The method of claim 16, further comprising:
- directing the working fluid through an inlet manifold in fluid communication with the inlet pipe, wherein the inlet manifold has a first plurality of openings positioned to direct the working fluid out of the inlet manifold, and wherein the working fluid in the inlet manifold is at a generally uniform pressure, and
- directing the working fluid through an outlet manifold in fluid communication with the outlet pipe, the outlet manifold having a second plurality of openings positioned to direct the working fluid into the outlet manifold.

18. The method of claim 16 wherein an individual flow passage has a generally rectangular cross section.

19. The method of claim 16 wherein a width of an individual flow passage is 1-2 mm.

20. The method of claim 16 wherein a thickness of an individual plate is 10-30 mm.

21. The method of claim 16 wherein a Reynolds number (Re) for the flow through an individual flow passage is smaller than 2,000.

22. The method of claim 16, wherein the plurality of flow passages has a width that is smaller than 1-2 mm, the method further comprising:
- directing the working fluid through a wide flow passage that has a width that is bigger than 1-2 mm;
- balancing the flow of the working fluid in the wide flow passage using a flow buoyancy; and
- maintaining the flow of the working fluid in the wide flow passage within the predominantly laminar regime.

23. The method of claim 16 wherein controlling the flow of the working fluid includes controlling the flow of the working fluid to be predominantly laminar by adjusting one or more control valves operably coupled to the controller.

* * * * *